(12) United States Patent
Isobe et al.

(10) Patent No.: US 11,781,589 B2
(45) Date of Patent: Oct. 10, 2023

(54) TAPERED ROLLER BEARING

(71) Applicant: NTN CORPORATION, Osaka (JP)

(72) Inventors: Nozomi Isobe, Shizuoka (JP); Yasuhito Fujikake, Shizuoka (JP); Takashi Kawai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 9 days.

(21) Appl. No.: 17/435,860

(22) PCT Filed: Mar. 3, 2020

(86) PCT No.: PCT/JP2020/008903
§ 371 (c)(1),
(2) Date: Sep. 2, 2021

(87) PCT Pub. No.: WO2020/184291
PCT Pub. Date: Sep. 17, 2020

(65) Prior Publication Data
US 2022/0154767 A1     May 19, 2022

(30) Foreign Application Priority Data

Mar. 12, 2019    (JP) ................................ 2019-044739
Feb. 26, 2020    (JP) ................................ 2020-030562

(51) Int. Cl.
*F16C 19/36*       (2006.01)
*F16C 33/46*       (2006.01)

(52) U.S. Cl.
CPC ........ *F16C 19/364* (2013.01); *F16C 33/4676* (2013.01)

(58) Field of Classification Search
CPC .............. F16C 33/4623; F16C 33/4629; F16C 33/467; F16C 33/4676; F16C 33/4682
See application file for complete search history.

(56) References Cited

U.S. PATENT DOCUMENTS

| | | | |
|---|---|---|---|
| 10,330,146 B2 * | 6/2019 | Kawai | ................ F16C 33/4676 |
| 2007/0014501 A1 | 1/2007 | Ueno et al. | |
| 2018/0245627 A1 | 8/2018 | Kawai | |

FOREIGN PATENT DOCUMENTS

| | | |
|---|---|---|
| JP | 53-57148 | 5/1978 |
| JP | 11-51060 | 2/1999 |

(Continued)

OTHER PUBLICATIONS

International Search Report dated May 26, 2020 in International (PCT) Application No. PCT/JP2020/008903.

(Continued)

*Primary Examiner* — James Pilkington
(74) *Attorney, Agent, or Firm* — Wenderoth, Lind & Ponack, L.L.P.

(57) ABSTRACT

A tapered roller bearing has pockets configured to receive tapered rollers in a cage. Each of column portions facing the pockets includes a deburring-press processed surface on a radially inner side of a side surface of the each of the column portions. The deburring-press processed surface includes a straight portion located at a center of the pocket in an axial direction, pocket corner rounded portions located at both ends of the pocket in the axial direction, and relief portions each formed between the straight portion and the pocket corner rounded portion. Each of the relief portions has a relief amount increased gradually from an axial end of the straight portion toward the pocket corner rounded portion, and is smoothly connected to the straight portion.

5 Claims, 15 Drawing Sheets

(56) References Cited

FOREIGN PATENT DOCUMENTS

| | | |
|---|---|---|
| JP | 2003-184893 | 7/2003 |
| JP | 2007-24168 | 2/2007 |
| JP | 2017-44281 | 3/2017 |

OTHER PUBLICATIONS

International Preliminary Report on Patentability and Written Opinion of the International Searching Authority dated Aug. 25, 2021 in International (PCT) Application No. PCT/JP2020/008903 .

* cited by examiner

Fig. 15

| Example | Related-art Product |
|---|---|
| L=13.3 mm | L=13.3 mm |
| La=10 mm | La'=6.7 mm |
| Lb=1.65 mm | Lb'=3.3 mm |
| Δmax=0.08 mm | Δ=0.2 mm |

TAPERED ROLLER BEARING

TECHNICAL FIELD

The present invention relates to a tapered roller bearing.

BACKGROUND ART

A tapered roller bearing mainly includes: an inner ring having a raceway surface having a conical shape on an outer periphery of the inner ring; an outer ring having a raceway surface having a conical shape on an inner periphery of the outer ring; a plurality of tapered rollers incorporated between both the raceway surfaces; and a cage configured to receive the tapered rollers. The cage is formed of a metal material, and generally includes: a small-diameter-side annular portion continuous on a small-diameter end surface side of the tapered rollers; a large-diameter-side annular portion continuous on a large-diameter end surface side of the tapered rollers; and a plurality of column portions coupling those annular portions to each other. The tapered rollers are received in pockets surrounded by the small-diameter-side annular portion, the large-diameter-side annular portion, and the column portions. The tapered roller bearing can support both a radial load and a thrust load, and is widely used in, for example, automobile or industrial machinery applications.

As illustrated in FIG. 12 and FIGS. 13, in a cage 55 formed by performing press working on a steel plate, there has hitherto been employed a configuration obtained by forming pockets 59 through punching and thereafter forming a deburring-press processed surface 58b on each of side surfaces 58a of column portions 58 which faces the pocket 59 with a punch so as to guide a tapered roller. FIG. 13a is a longitudinal sectional view of the cage at a center of the pocket. FIG. 13b is a sectional view as viewed toward a conical surface indicated by the line C-C of FIG. 13a in a direction of arrows of the line C-C. As illustrated in FIG. 13a and FIG. 13b, the deburring-press processed surface 58b is formed straight in an axial direction on the side surface 58a of the column portion 58, and this shape is a standard specification in a cage of a tapered roller bearing.

In particular, in recent years, a reduction in torque is given as one of functions required for a tapered roller bearing for an automobile, which is configured to support a power transmission shaft such as a differential or a transmission. A tapered roller bearing which satisfies such a need is proposed in, for example, Patent Document 1. A cage of the tapered roller bearing of Patent Document 1 is illustrated in FIG. 14. FIG. 14a is a longitudinal sectional view of a cage 105 at a center of a pocket 109. FIG. 14b is a sectional view as viewed toward a conical surface indicated by the line D-D of FIG. 14a in a direction of arrows of the line D-D. There is proposed a configuration in which, in order to reduce torque loss caused by flow resistance of lubricating oil in the tapered roller bearing with the lubricating oil flowing therein, cutouts 110a and 110b are formed on a small-width side of the column portion 108 of the pocket 109 and a large-width side of the column portion 108 to shorten a length of a roller guide surface (deburring-press processed surface 108b) of the column portion 108 (Patent Document 1). In FIG. 13b and FIG. 14b referred to above, hatching of the cross section is omitted.

PRIOR ART DOCUMENTS

Patent Documents

Patent Document 1: JP 2007-24168 A

SUMMARY OF THE INVENTION

Problems to be Solved by the Invention

Even though the reduction in torque is required in recent years for a tapered roller bearing for an automobile configured to support a power transmission shaft such as a differential or a transmission, it has been found that, in the tapered roller bearing including the cage having the standard specification described above, the guide surface (sliding surface) of the tapered roller is long, and this tapered roller bearing is not sufficient for the reduction in torque.

In the tapered roller bearing of Patent Document 1, as illustrated in FIGS. 14a and 14b, the cutouts 110a and 110b are formed in the column portion 108 of the cage 105. Thus, when the column portion 108 has a stepped shape, press working on the cage is considered to be difficult. In particular, in a tapered roller bearing for an automobile having a relatively small diameter (bearing outer diameter of from about $\phi 40$ mm to about $\phi 150$ mm), in order to secure required cage strength, it is required to consider reducing the number of rollers, for example.

The present invention has been made in view of the above-mentioned problems, and has an object to provide a tapered roller bearing that attains a reduction in torque while suppressing a reduction in cage strength.

Solutions to the Problems

As a technical measure for achieving the object described above, according to the present invention, there is provided a tapered roller bearing, comprising: an inner ring having a raceway surface having a conical shape on an outer periphery of the inner ring; an outer ring having a raceway surface having a conical shape on an inner periphery of the outer ring; a plurality of tapered rollers incorporated between both the raceway surfaces; and a cage configured to receive the tapered rollers, wherein the cage is formed of a metal material, and comprises: a small-diameter-side annular portion continuous on a small-diameter end surface side of the tapered rollers; a large-diameter-side annular portion continuous on a large-diameter end surface side of the tapered rollers; and a plurality of column portions coupling the small-diameter-side annular portion and the large-diameter-side annular portion to each other, wherein the small-diameter-side annular portion, the large-diameter-side annular portion, and the column portions define pockets configured to receive the tapered rollers, wherein each of the column portions facing the pockets comprises a deburring-press processed surface on a radially inner side of a side surface of the each of the column portions, wherein the deburring-press processed surface comprises: a straight portion located at a center of the pocket in an axial direction; pocket corner rounded portions located at both ends of the pocket in the axial direction; and relief portions each formed between the straight portion and the pocket corner rounded portion, and wherein each of the relief portions has a relief amount increased gradually from an axial end of the straight portion toward the pocket corner rounded portion, and is smoothly connected to the straight portion.

With the above-mentioned configuration, it is possible to achieve a tapered roller bearing that attains a reduction in torque while suppressing a reduction in cage strength.

Specifically, it is preferred that the above-mentioned relief portions be each formed in a straight shape inclined with respect to an axial direction of the column portion. With this, deburring press follows related-art deburring press, and manufacture is possible by changing a shape of the punch, thereby being capable of suppressing an increase in processing cost without requiring a change of processes.

It is preferred that the above-mentioned relief portions be each formed in a curved shape curved in an axial direction of the column portion in a projecting manner. With this, deburring press follows related-art deburring press, and manufacture is possible by changing a shape of the punch, thereby being capable of suppressing an increase in processing cost without requiring a change of processes. Further, the degree of freedom in setting a shape of a smooth connecting portion between the straight portion and the relief portion is increased.

It is preferred that the above-mentioned straight portion be formed in a center-protruding shape in the axial direction of the column portion. With this, lubricity at the time of guiding the tapered roller to a contact guide portion of the straight portion is excellent, and the tapered roller can be stably guided.

It is preferred that a small-diameter-end side surface of the pocket which is opposed to a small end surface of the above-mentioned tapered roller be formed in a protruding shape. With this, the reduction in torque can be further promoted, and avoidance of an interference with a chamfered portion of the tapered roller can be more reliably attained.

It is preferred that the small-diameter-end side surface of the pocket which is opposed to the small end surface of the above-mentioned tapered roller have a recess portion formed to penetrate between an inner peripheral surface and an outer peripheral surface of the cage in a radial direction of the cage. With this, stirring resistance of lubricating oil is reduced, thereby being capable of further promoting the reduction in torque.

Effects of the Invention

According to the present invention, it is possible to achieve the tapered roller bearing that attains the reduction in torque while suppressing the reduction in cage strength.

BRIEF DESCRIPTION OF DRAWINGS

FIG. 3b is a partial external view as viewed in a direction of arrows of the line B-B of FIG. 3a.

FIG. 9b is a partial external view as viewed in a direction of arrows of the line B-B of FIG. 9a.

FIG. 15 illustrates a dimensional relationship of the cages.

EMBODIMENTS OF THE INVENTION

Figure 1:
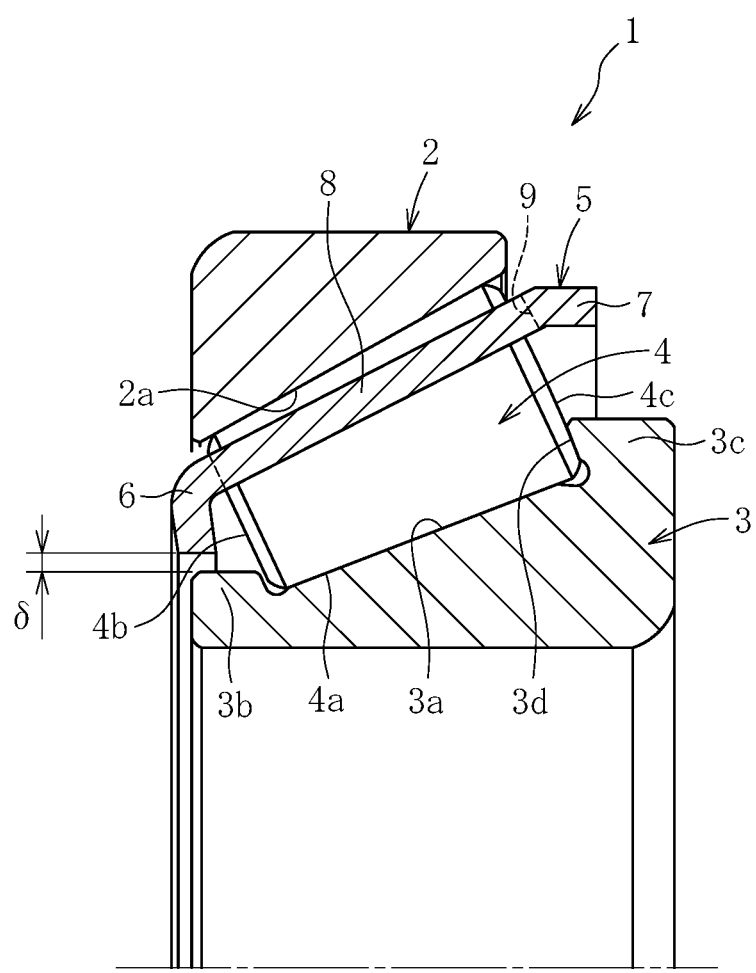
FIG. 1 is a longitudinal sectional view for illustrating a tapered roller bearing according to a first embodiment of the present invention.
Figure 2:
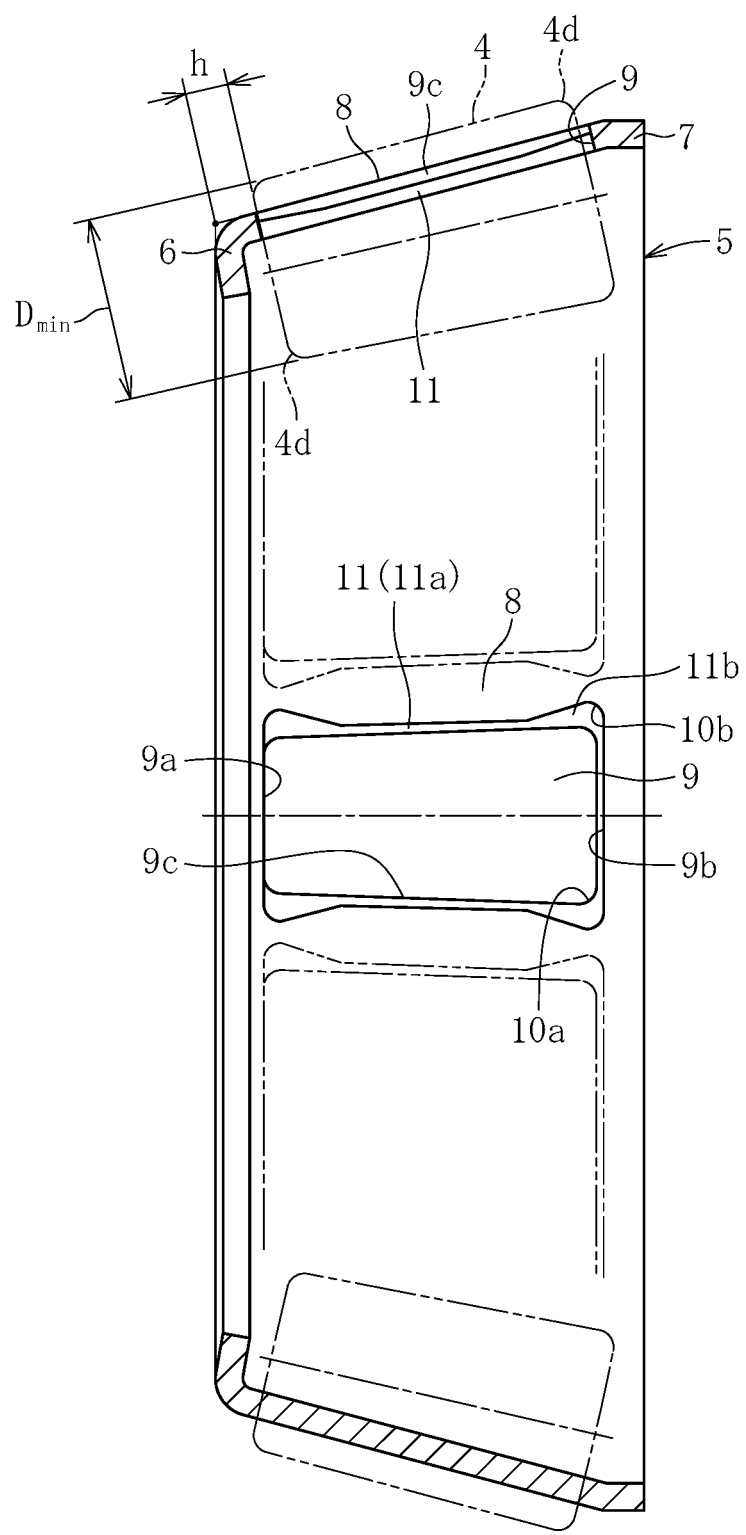
FIG. 2 is a longitudinal sectional view of a cage of FIG. 1.

A tapered roller bearing according to a first embodiment of the present invention is described with reference to FIG. 1 to FIG. 8. FIG. 1 is a longitudinal sectional view for illustrating an upper half from a center line of the tapered roller bearing in this embodiment. FIG. 2 is a longitudinal sectional view of a cage of FIG. 1.

As illustrated in FIG. 1, a tapered roller bearing 1 comprises an outer ring 2, an inner ring 3, tapered rollers 4 incorporated between the outer ring 2 and the inner ring 3, and a cage 5 configured to hold the tapered rollers 4. The outer ring 2 has a raceway surface 2a having a conical shape which is formed on an inner periphery of the outer ring 2. The inner ring 3 has a raceway surface 3a having a conical shape which is formed on an outer periphery of the inner ring 3, and comprises a small flange portion 3b on a small-diameter side and a large flange portion 3c on a large-diameter side. The plurality of tapered rollers 4 are incorporated between the raceway surface 2a of the outer ring 2 and the raceway surface 3a of the inner ring 3. The tapered rollers 4 are received in pockets 9 of the cage 5, respectively, and are held at predetermined intervals in a circumferential direction.

As illustrated in FIG. 1, the tapered roller 4 has a rolling surface 4a having a conical shape which is formed on an outer periphery of the tapered roller 4, and comprises a small end surface 4b formed on the small-diameter side and a large end surface 4c formed on the large-diameter side. The large end surface 4c of the tapered roller 4 is received on a large flange surface 3d of the large flange portion 3c of the inner ring 3.

As illustrated in FIG. 2, the cage 5 comprises a small-diameter-side annular portion 6, a large-diameter-side annular portion 7, and a plurality of column portions 8 connecting the small-diameter-side annular portion 6 and the large-diameter-side annular portion 7 to each other in an axial direction. The cage 5 is formed by performing press working on a metal material (for example, a steel plate). The pockets 9 configured to receive the tapered rollers 4 indicated by the alternate long and two short dash lines are formed by the small-diameter-side annular portion 6, the large-diameter-side annular portion 7, and the column portions 8. An opening of the pocket 9 configured to receive the tapered roller 4 has a trapezoidal shape formed by a small-diameter-end side surface 9a which is opposed to the small end surface 4b of the tapered roller 4, a large-diameter-end side surface 9b which is opposed to the large end surface 4c, and side surfaces 9c of the column portions 8 which are opposed to the rolling surface 4a of the tapered roller 4 (opposed thereto in the circumferential direction). Pocket corner rounded portions 10a are each formed at a portion at which the small-diameter-end side surface 9a or the large-diameter-end side surface 9b and the side surface 9c intersect each other. Deburring-press processed surfaces 11 are each formed on a radially inner side of the side surface 9c of the column portion 8 which corresponds to the rolling surface 4a of the tapered roller 4. In FIG. 2, the opening shape of one pocket 9 located on a center line of the cage 5 is indicated by the solid line. A predetermined number of pockets 9 separated from this pocket 9 by the column portions 8 are formed, and those pockets 9 are indicated by the alternate long and two short dash lines in a simplified manner as a series of contours.

Figure 3A:
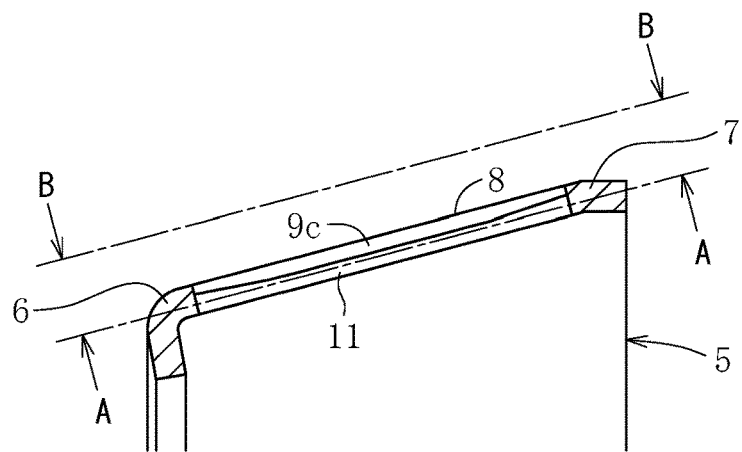
FIG. 3a is a partial longitudinal sectional view at a center line of a pocket of the cage.
Figure 3B:
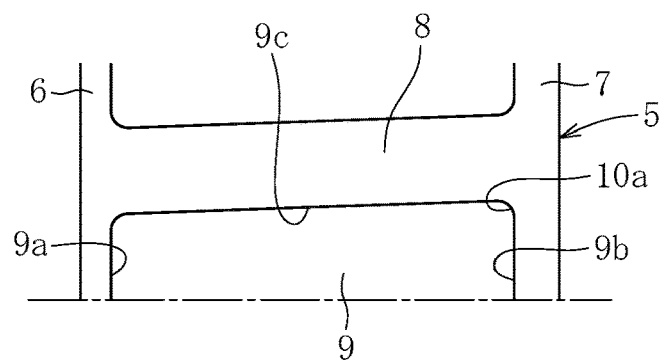
Figure 3C:
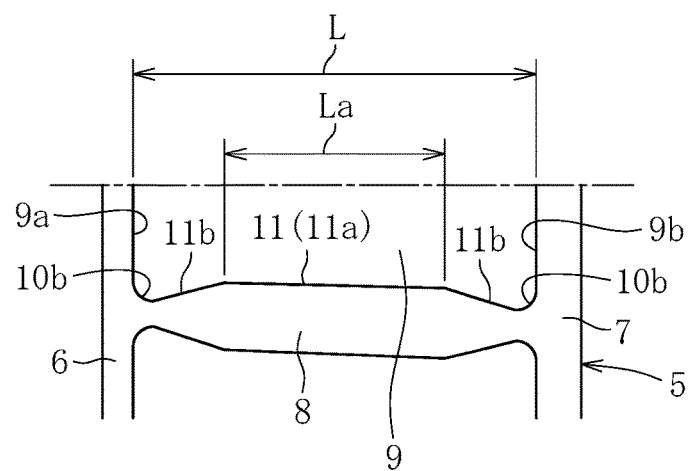
FIG. 3c is a sectional view as viewed toward a conical surface indicated by the line A-A of FIG. 3a in a direction of arrows of the line A-A.
Figure 4:
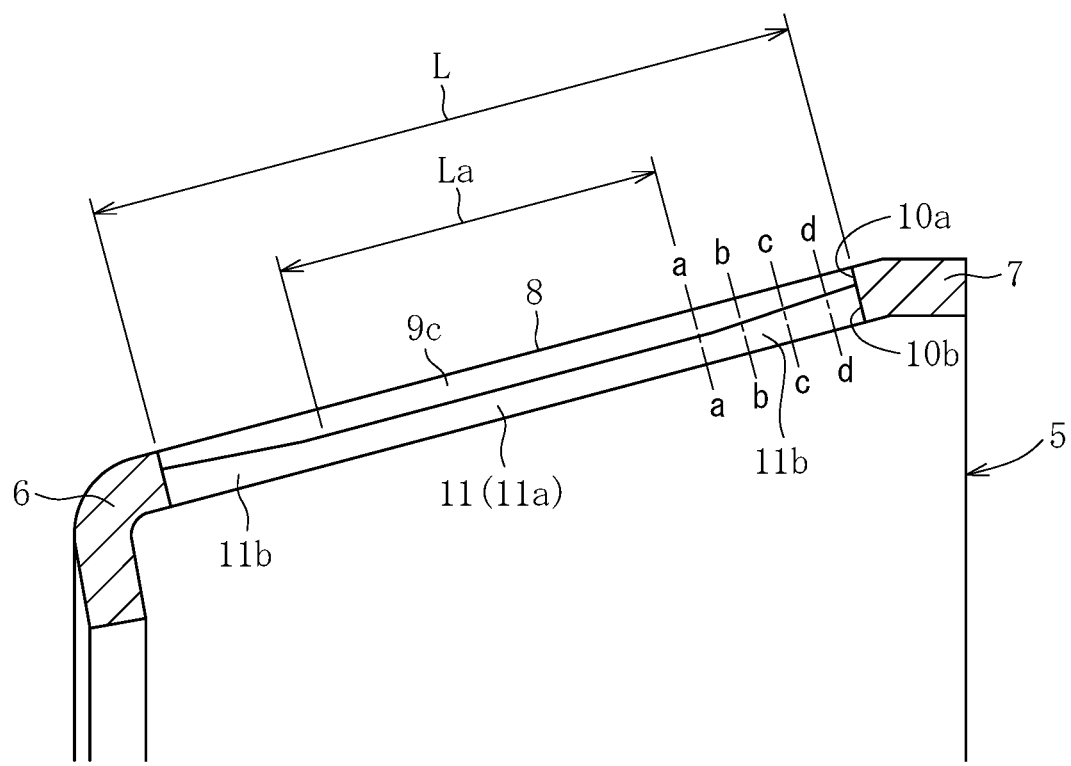
FIG. 4 is a partial longitudinal sectional view for illustrating details of a deburring-press processed surface of a column portion of the cage of FIG. 2.
Figure 5A:
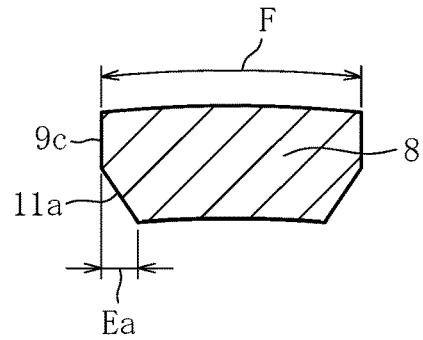
FIG. 5a is a sectional view at the line a-a of FIG. 4 in cross sections of the column portion at respective axial positions of FIG. 4.
Figure 5B:
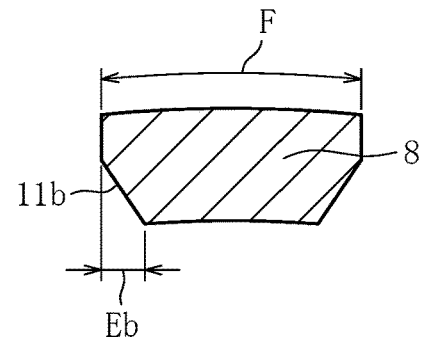
FIG. 5b is a sectional view at the line b-b of FIG. 4.
Figure 5C:
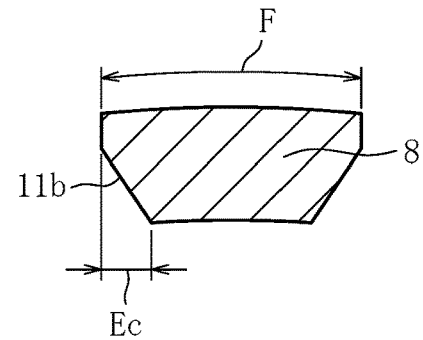
FIG. 5c is a sectional view at the line c-c of FIG. 4.
Figure 5D:
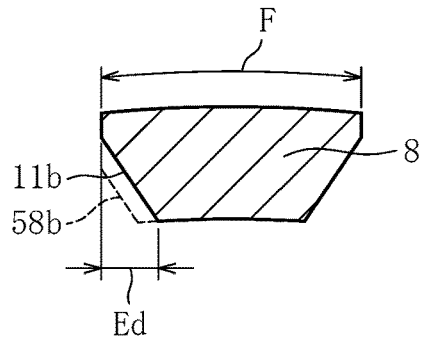
FIG. 5d is a sectional view at the line d-d of FIG. 4.

The outline of the tapered roller bearing 1 in this embodiment is as described above. Next, a characteristic configuration of the tapered roller bearing 1 in this embodiment is described with reference to FIG. 3 to FIG. 5. FIG. 3a is a partial longitudinal sectional view at a center line of the pocket of the cage. FIG. 3b is a partial external view as viewed in a direction of arrows of the line B-B of FIG. 3a. FIG. 3c is a sectional view as viewed toward a conical surface indicated by the line A-A of FIG. 3a in a direction of arrows of the line A-A. FIG. 4 is a partial longitudinal sectional view for illustrating details of the deburring-press processed surface of the column portion of the cage of FIG. 3a. FIG. 5 are illustrations of cross sections of the column portion at respective axial positions of FIG. 4. FIG. 5a is a sectional view at the line a-a of FIG. 4. FIG. 5b is a sectional view at the line b-b of FIG. 4. FIG. 5c is a sectional view at the line c-c of FIG. 4. FIG. 5d is a sectional view at the line d-d of FIG. 4.

As a characteristic configuration of the tapered roller bearing 1 in this embodiment, each of the column portions 8 facing the pockets 9 comprises the deburring-press processed surface 11 on a radially inner side of the side surface 9c of the each of the column portions 8. The deburring-press processed surface 11 comprises: a straight portion 11a located at a center of the pocket 9 (column portion 8) in the axial direction; pocket corner rounded portions 10b located at both ends of the pocket 9 in the axial direction; and relief portions 11b each formed between the straight portion 11a and the pocket corner rounded portion 10b. Each of the relief portions 11b has a relief amount increased gradually from an axial end of the straight portion 11a toward the pocket corner rounded portion 10b, and is smoothly connected to the straight portion 11a and the pocket corner rounded portion 10b.

Specifically, as illustrated in FIG. 3b, as viewed in the direction of arrows of the line B-B of FIG. 3a, the opening of the pocket 9 of the cage 5 has a trapezoidal shape formed by the small-diameter-end side surface 9a which is opposed to the small end surface 4b of the tapered roller 4 (see FIG. 2), the large-diameter-end side surface 9b which is opposed to the large end surface 4c, and the side surfaces 9c of the column portions 8 which are opposed to the rolling surface 4a of the tapered roller 4. Each of the side surfaces 9c is straight in the axial direction of the column portion 8. Although not illustrated, regarding punching for the pockets 9, an outer periphery of an annular preform of the cage 5 is supported by a die, a plurality of punches are arranged on an inner periphery of the annular preform, and the punches are moved to a radially outer side to punch the annular preform in the radial direction with punching blades of the punches, to thereby form the plurality of pockets 9. Each punch has the punching blade having the shape corresponding to the shape of each pocket 9 illustrated in FIG. 3b.

As illustrated in FIG. 3a, the deburring-press processed surface 11 is formed on a radially inner side of the side surface 9c extending straight in the axial direction in the column portion 8 facing the pocket 9. The deburring-press processed surface 11 is formed to be inclined with respect to the side surfaces 9c so as to slidably guide the rolling surface 4a of the tapered roller 4 (see FIG. 5a to FIG. 5d). As illustrated in FIG. 3c which is a sectional view as viewed toward the conical surface indicated by the line A-A of FIG. 3a in the direction of arrows of FIG. 3a, the pocket corner rounded portion 10a formed by punching for the pocket 9 and the pocket corner rounded portion 10b formed by the deburring press on the column portion 8 have arc shapes having substantially the same curvature radius. Similarly to a related-art standard cage, a center of the column portion 8 in the axial direction secures a straight shape in order to stabilize a posture of the tapered roller 4 during a bearing operation. In FIG. 3c, hatching of the cross section is omitted.

The relief portion 11b is formed straight while being slightly inclined from an axial end of the straight portion 11a toward the pocket corner rounded portion 10b so that the relief amount is gradually increased in the circumferential direction. The relief portion 11b is smoothly connected to the axial end of the straight portion 11a and the pocket corner rounded portion 10b. In this embodiment, a length La of the straight portion 11a is set in a range of from 50% to 90% of an entire length L of the pocket 9, and is preferably from 50% to 80% thereof. With this, a contact length between the tapered roller 4 and the deburring-press processed surface 11 (guide surface) of the column portion 8 is reduced, thereby attaining a reduction in torque. When the length La is smaller than 50% of the entire length L, the deburring-press processed surface 11 (guide surface) configured to guide the tapered roller 4 is short, and the posture of the roller during a bearing operation may become unstable. Meanwhile, when the length La exceeds 90% of the entire length L, the contact length between the tapered roller 4 and the deburring-press processed surface 11 (guide surface) is excessively large, and a torque reduction effect is not obtained.

Figure 12:
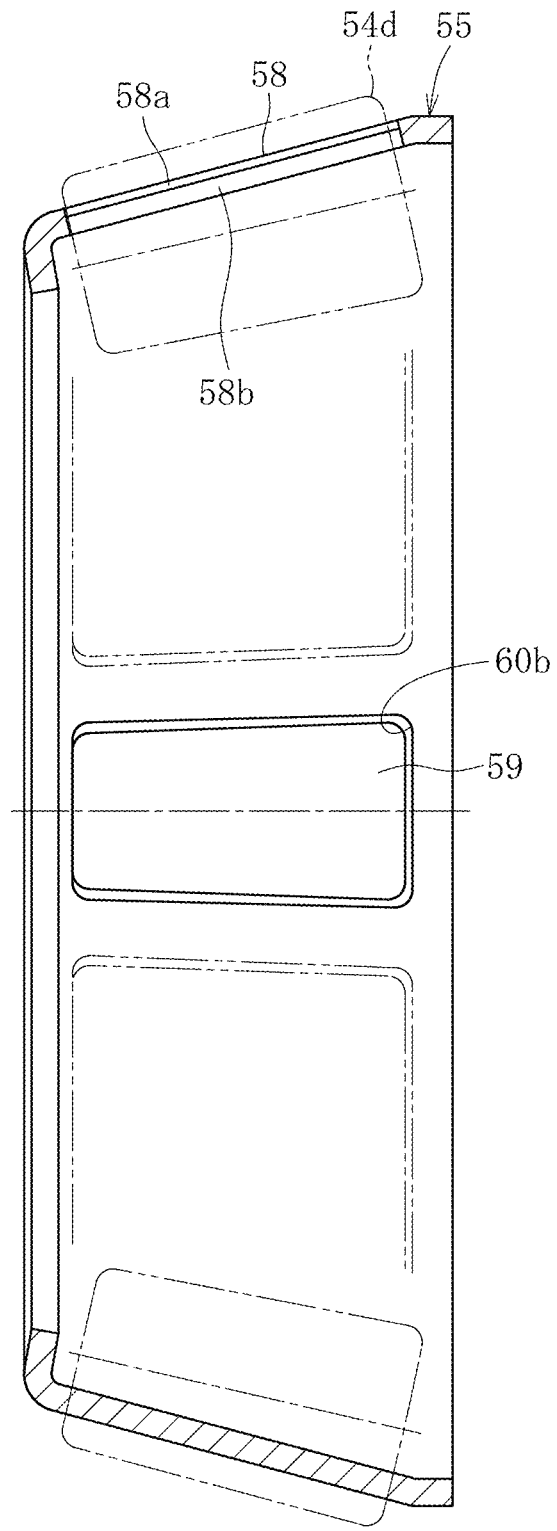
FIG. 12 is a longitudinal sectional view of a related-art standard cage.

As another advantage of the deburring-press processed surface 11 of the column portion 8 in this embodiment, a pocket corner rounded portion 60*b* (see FIG. 12) in the related-art standard cage may have a positional relationship of being extremely close to a chamfered rounded portion 54*d* of a tapered roller 54. Thus, it is required in deburring press to smoothly connect a deburring-press processed surface 58*b* of a column portion to the pocket corner rounded portion 60*b* while paying careful attention. However, in this embodiment, as illustrated in FIG. 2, the relief portion 11*b* of the deburring-press processed surface 11 is located at a position away from the chamfered rounded portion 4*d* of the tapered roller 4, and the pocket corner rounded portion 10*b* has a positional relationship which does not interfere with the chamfered rounded portion 4*d*, thereby facilitating arrangements or processing of the deburring press. Further, the deburring press follows related-art deburring press, and manufacture is possible by changing a shape of the punch, thereby being capable of suppressing an increase in processing cost without requiring a change of processes.

Further, details of the deburring-press processed surface 11 of the column portion 8 are described with reference to FIG. 4 and FIG. 5. As illustrated in FIG. 4, the axial end of the straight portion 11*a* located at the center of the column portion 8 in the axial direction in the deburring-press processed surface 11 corresponds to the line a-a. The straight portion 11*a* and the relief portion 11*b* are connected to each other at the axial position of the line a-a, and the relief portion 11*b* is connected to the pocket corner rounded portion 10*b* at the axial position of the line d-d. The line b-b and the line c-c are indicated between the line a-a and the line d-d as axial positions at equal intervals.

The cross sections of the column portion 8 which correspond to the axial positions of the line a-a, the line b-b, the line c-c, and the line d-d illustrated in FIG. 4 are illustrated in FIG. 5*a*, FIG. 5*b*, FIG. 5*c*, and FIG. 5*d*, respectively. As illustrated in FIG. 5*a*, at the axial position of the line a-a, a deburring-press processing amount of the straight portion 11*a* is Ea, and is constant over an entire length of the straight portion 11*a*. In addition, a deburring-press processing amount of a starting edge of the relief portion 11*b* connected to the straight portion 11*a* is also Ea. As illustrated in FIG. 5*b*, a deburring-press processing amount of the relief portion 11*b* at the axial position of the line b-b is Eb. Similarly, as illustrated in FIG. 5*c*, a deburring-press processing amount of the relief portion 11*b* at the axial position of the line c-c is Ec, and, as illustrated in FIG. 5*d*, a deburring-press processing amount of the relief portion 11*b* at the axial position of the line d-d is Ed. As described above, the deburring-press processing amounts Ea, Eb, Ec, and Ed of the relief portion 11*b* become gradually larger toward an axial end portion side of the column portion 8, that is, the pocket corner rounded portion 10*b*.

The deburring-press processing amounts are as described above, and relief amounts of the relief portion 11*b* are organized. With respect to the axial position of the line a-a illustrated in FIG. 5*a*, the relief amount at the axial position of the line b-b illustrated in FIG. 5*b* is $\Delta b = Eb \cdot Ea$, the relief amount at the axial position of the line c-c illustrated in FIG. 5*c* is $\Delta c = Ec \cdot Ea$, and the relief amount at the axial position of the line d-d illustrated in FIG. 5*d* is $\Delta d = Ed \cdot Ea$. The relief amounts are used in the above sense in Description and Claims.

The relief amount $\Delta d = Ed \cdot Ea$ at the axial position of the line d-d illustrated in FIG. 5*d* is a maximum relief amount $\Delta max$. In this embodiment, the maximum relief amount $\Delta max$ ($=Ed \cdot Ea$) exceeds 0 mm, and is 0.5 mm or less. The maximum relief amount $\Delta max$ ($=Ed \cdot Ea$) is preferably 0.2 mm or less. When the maximum relief amount $\Delta max$ ($=Ed \cdot Ea$) exceeds 0.5 mm, a reduction of the cross sectional area of the column portion 8 becomes larger, and a reduction in strength becomes larger with respect to a standard cage 55.

In FIGS. 5, a processing example in which the side surface 9*c* becomes narrower toward the column end portion is described, but the width of the side surface 9*c* in the a-a cross section may be maintained to 10*a* (that is, the width of 9*c*=the width of 10*a*) by devising a press working die.

Figure 13A:
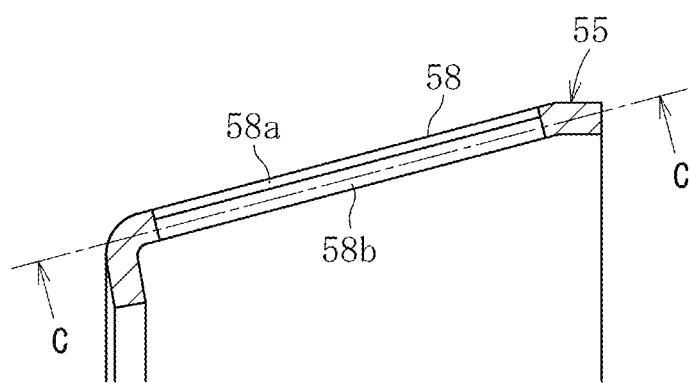
FIG. 13a is a partial view of the cage of FIG. 12, and is a partial longitudinal sectional view at a center line of a pocket of the cage.
Figure 13B:
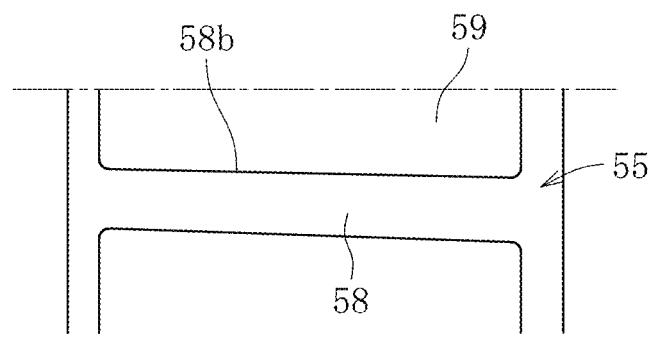
FIG. 13b is a sectional view as viewed toward a conical surface indicated by the line C-C of FIG. 13a in a direction of arrows of the line C-C.

Here, supplementary description is given of a relationship in strength between the cage 5 in this embodiment and the related-art standard cage. As illustrated in FIG. 5*a*, FIG. 5*b*, FIG. 5*c*, and FIG. 5*d*, the side surface 9*c* of the column portion 8 of the cage 5 in this embodiment is straight over the entire axial length of the column portion 8, and hence a width F between the side surfaces 9*c* of the column portion 8 is constant. The width F between the side surfaces 9*c* is equal to a width dimension between the side surfaces 58*a* and 58*a* of a column portion of the related-art standard cage 55 illustrated in FIG. 12 and FIG. 13. Further, the deburring-press processing amount Ea of the straight portion 11*a* of the deburring-press processed surface 11 is equal to a deburring-press processing amount of the deburring-press processed surface 58*b* of the above-mentioned standard cage 55. In FIG. 5*d*, the deburring-press processed surface 58*b* of the standard cage 55 is indicated by the broken line. The cage in this embodiment has a relationship in which the cross sectional area of the column portion 8 is reduced corresponding to the relief amounts in regions of the relief portions 11*b* of the deburring-press processed surface 11 as compared to the standard cage. Thus, in the tapered roller bearing 1 in this embodiment, a reduction in cage strength can be suppressed to the extent possible by setting the maximum relief amount $\Delta max$ as appropriate.

The boundary between the straight portion 11*a* and the relief portion 11*b* at the axial position of the line a-a and the boundary between the relief portion 11*b* and the pocket corner rounded portion 10*b* at the axial position of the line d-d each have a shape of being smoothly continuous in an arc shape or a shape of being smoothly continuous without an edge by shot blasting. With this, stress concentration does not occur, and edge contact with the tapered roller 4 can be prevented.

The straight shape is described as an example of the shape of the straight portion 11*a* of the deburring-press processed surface 11, but the straight portion 11*a* may have a center-protruding shape. In the center-protruding shape, a difference in height in the straight portion 11*a* between the center portion and each end portion is set in a range of from 5 μm to 100 μm, and is preferably from about 10 μm to about 30 μm. In this case, lubricity at the time of guiding the tapered roller 4 to a contact guide portion of the straight portion 11*a* is excellent, and the tapered roller 4 can be stably guided. When the difference in height in the straight portion 11*a* between the center portion and each end portion exceeds 100 μm, contact pressure becomes larger, and there is a fear in that the surface is damaged due to the contact between the straight portion 11*a* and the tapered roller 4. When the difference is less than 5 μm, there is a fear in that the column surface becomes uneven due to characteristics of press working.

In the above, the relief portion 11b on the large-diameter-side annular portion 7 side of the cage 5 is described. The relief portion 11b on the small-diameter-side annular portion 6 side is the same, and description thereof is omitted.

Figure 6:
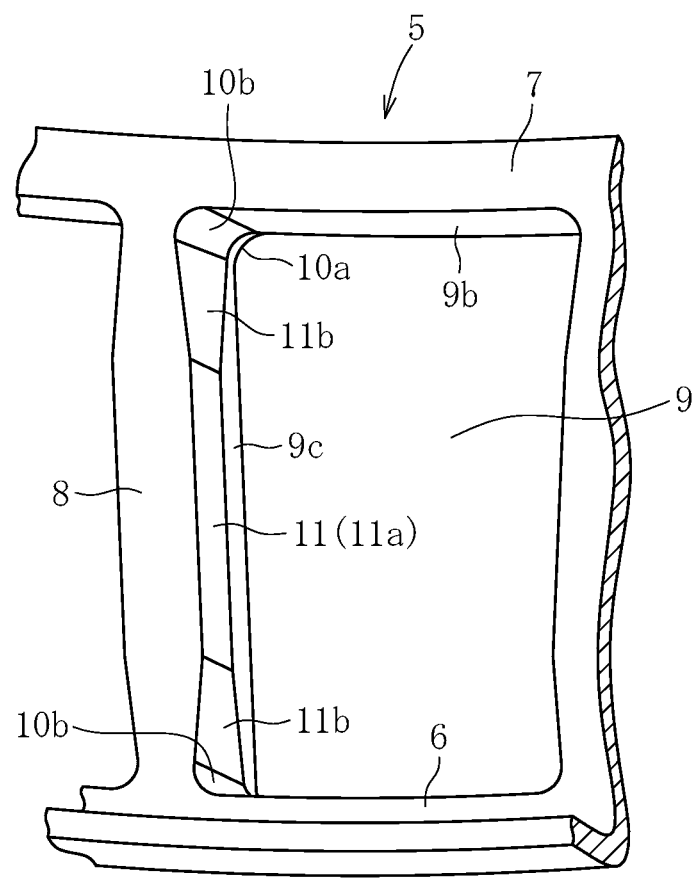
FIG. 6 is a perspective view as viewed from a radially inner side of the cage of FIG. 2.

The shape of the pocket 9 of the cage 5 in this embodiment described above is illustrated in FIG. 6 which is a perspective view as viewed from the radially inner side of the cage. With FIG. 6, the shape of the pocket 9 of the cage 5 is easily understood. As illustrated in FIG. 6, it is understood that the pocket corner rounded portion 10a formed by punching for the pocket 9 and the pocket corner rounded portion 10b formed by the deburring press on the column portion 8 have arc shapes having substantially the same curvature radius.

Figure 7:
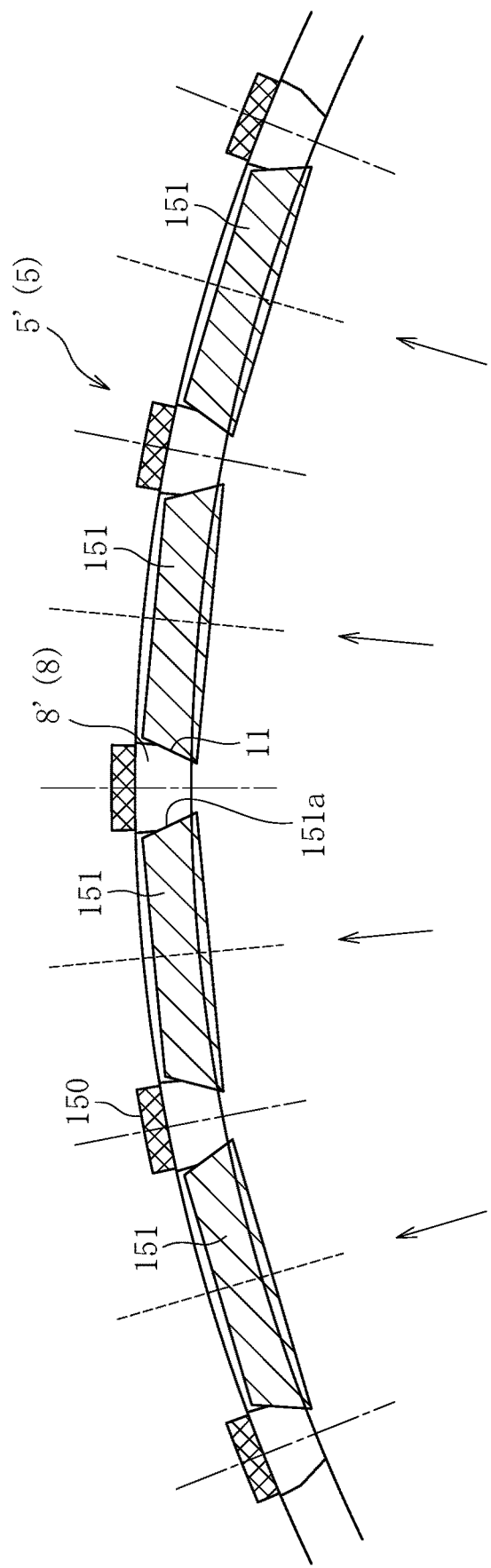
FIG. 7 is a transverse sectional view for illustrating deburring press on the column portion of the cage.

Finally, the deburring press on the column portions 8 is described with reference to FIG. 7. In the deburring press, as illustrated in FIG. 7, column portions 8' of an intermediate product 5' of the cage 5 after the punching for the pockets 9 described above are supported by a die 150 from an outer periphery, and a plurality of punches 151 are arranged on an inner periphery of the intermediate product 5'. Each punch 151 has a forming surface 151a having a shape corresponding to the deburring-press processed surface 11, that is, the straight portion 11a, the relief portions 11b, and the pocket corner rounded portions 10b. As illustrated in FIG. 7, each punch 151 is moved to the radially outer side as indicated by the arrow, and the forming surface 151a of each punch 151 is pressed against the column portion 8' of the intermediate product 5' from the radially inner side, thereby forming the deburring-press processed surface 11 on the column portion 8'. With this, the column portions 8' are finished to obtain the column portions 8, thereby forming the cage 5. This state is illustrated in FIG. 7. In FIG. 7, hatching of the cross section of the column portions 8', 8 is omitted.

Here, in FIG. 7, so-called "total-columns pressing processing" in which the integral deburring-press punch 151 processes the respective columns 8' at one time is illustrated, but so called "one-column pressing processing" in which one punch processes only one of the two column portions 8' may employed.

Example

Figure 14A:
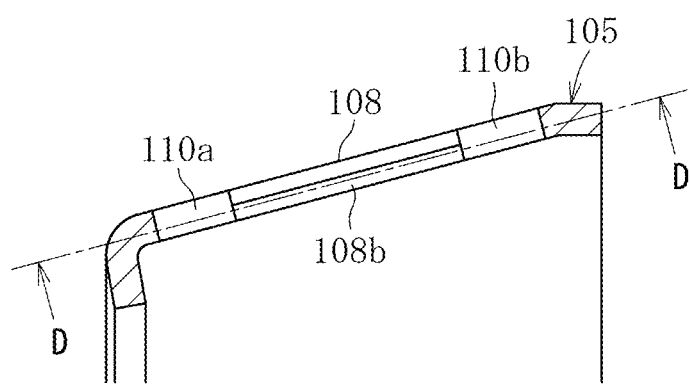
FIG. 14a is a partial view of a related-art cage, and is a partial longitudinal sectional view at a center line of a pocket of the cage.
Figure 14B:
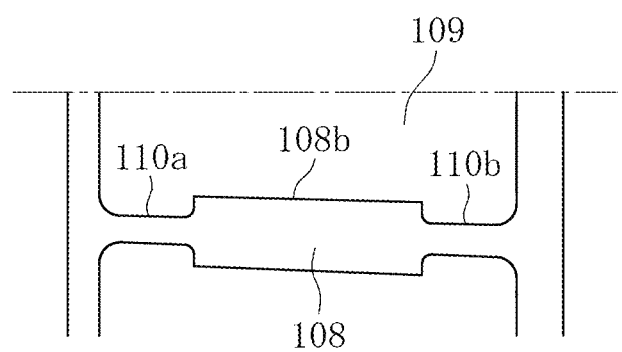
FIG. 14b is a sectional view as viewed toward a conical surface indicated by the line D-D of FIG. 14a in a direction of arrows of the line D-D.
Figure 15:
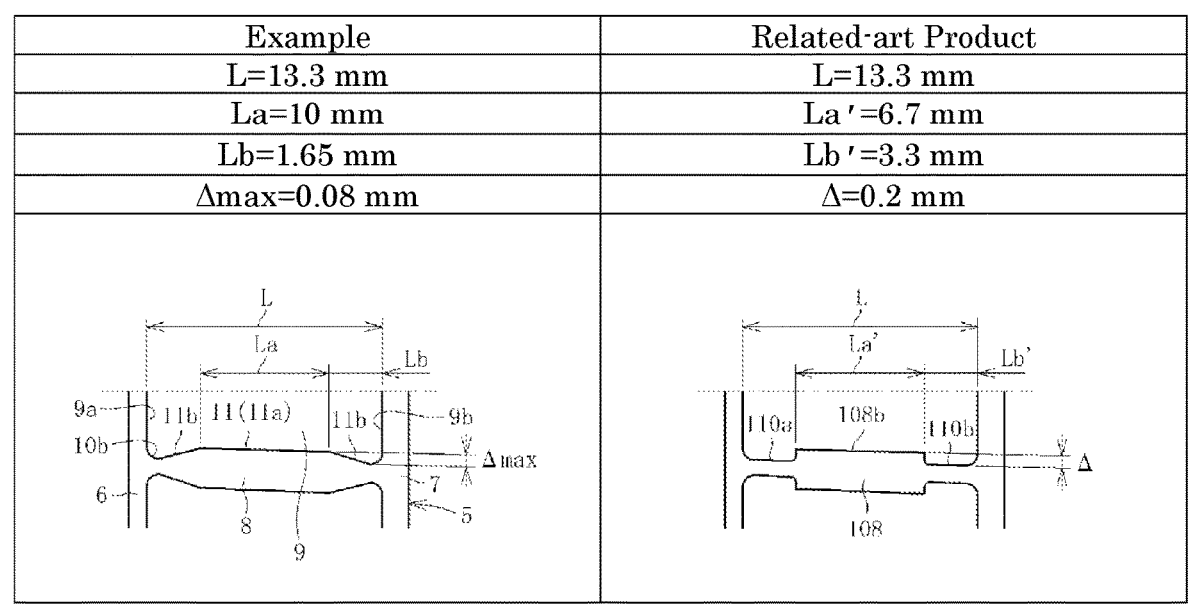

Next, a torque reduction effect in Example of the present invention with respect to a related-art product is described. Example corresponds to a tapered roller bearing based on the first embodiment. The related-art product corresponds to that illustrated in FIG. 14a and FIG. 14b. Example and the related-art product are the same in a bearing size (an inner diameter of φ35 mm×an outer diameter of φ80 mm×a width of 20 mm), and are different from each other only in a pocket shape of a cage. A dimensional relationship of the cages is shown in FIG. 15. In FIG. 15, the drawing of Example is obtained by adding dimension lead lines and reference symbols Lb and Δmax to FIG. 3c, and the drawing of the related-art product is obtained by adding dimension lead lines and reference symbols L, La', Lb', and A to FIG. 14b.

Test conditions for measurement of bearing rotational torque are as follows both for Example and the related-art product.

<Test Conditions>
Bearing size: inner diameter of 05 mm×outer diameter of φ80 mm×width of 20 mm
Test load: axial load=3,700 N (light load condition)
Rotation speed: 0 to 6,000 r/min (rising up to 6,000 r/min in 50 seconds)
Lubricating oil: kinematic viscosity at 40° C. of 25 mm²/s, kinematic viscosity at 100° C. of 5.5 mm²/s, excellent oil environment
Test temperature: 85° C.

Figure 8:
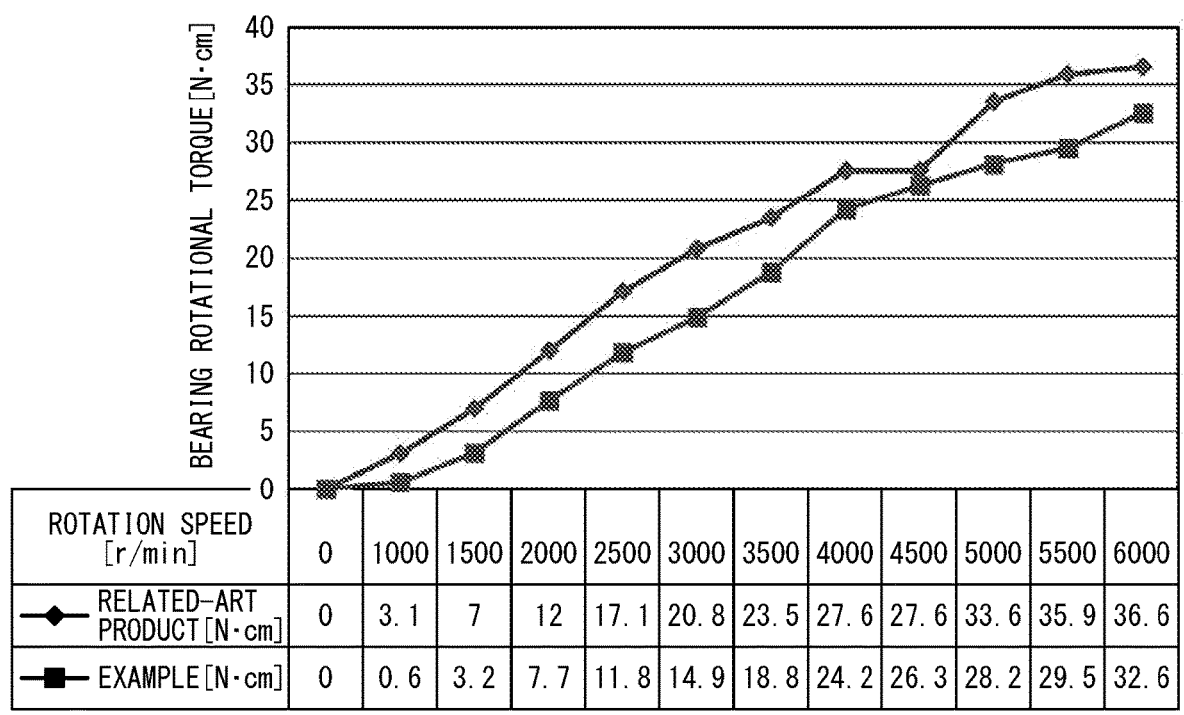
FIG. 8 is a graph for showing results of a bearing rotational torque test.

As a result of the bearing rotational torque test shown in FIG. 8, in Example, a torque reduction effect of 28% of the related-art product on average was obtained. It is considered that this result is due to the fact that an oil film of a sliding contact portion of a tapered roller and a column portion becomes extremely thin due to the low viscosity of lubricating oil. That is, in the related-art product, a length La' of a roller guide surface 108b of a column portion 108 is set smaller than the length La of the straight portion 11a in Example, but the boundaries between the roller guide surface 108b and cutouts 110a and 110b each have a rectangular shape (stepped shape), and an oil film is less likely to be formed. In contrast, in Example, the straight portion 11a and the relief portions 11b are smoothly connected to each other, and there is no excessive boundary, so that an oil film is likely to be formed. Accordingly, Example in which metal contact between the tapered roller and a column portion is small exhibits low torque. With this, a new shape of a low-torque column portion adapted to a current trend of the low viscosity of the lubricating oil is found.

Figure 9A:
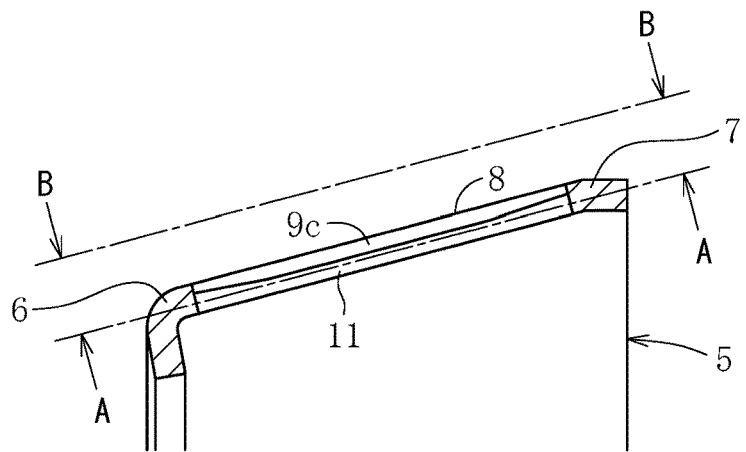
FIG. 9a is an illustration of a modification example of the cage, and is a partial longitudinal sectional view at a center line of the pocket of the cage.
Figure 9B:
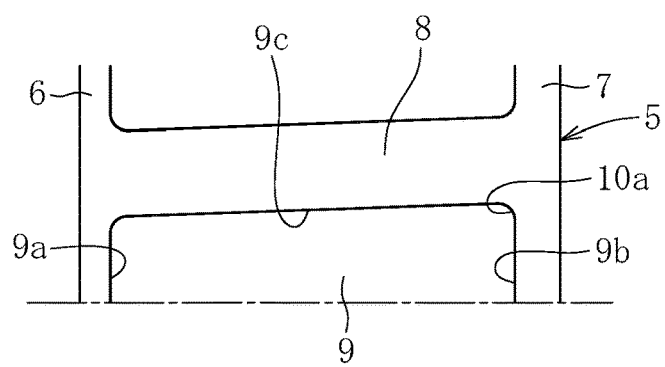
Figure 9C:
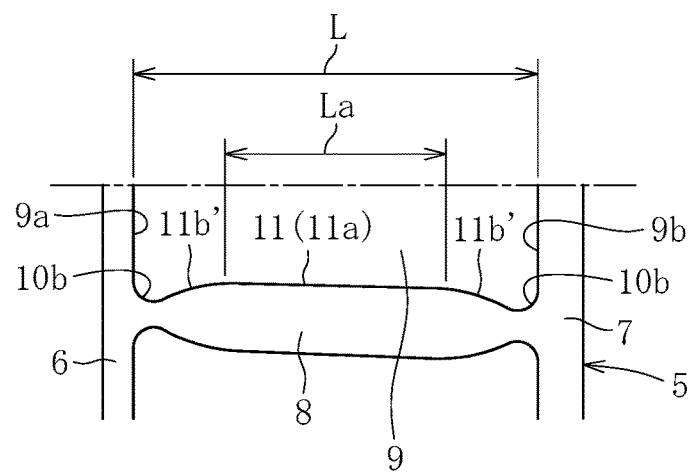
FIG. 9c is a sectional view as viewed toward a conical surface indicated by the line A-A of FIG. 9a in a direction of arrows of the line A-A.

Next, a modification example of the cage 5 is described with reference to FIG. 9. FIG. 9a is a partial longitudinal sectional view at a center line of the pocket of the cage. FIG. 9b is a partial external view as viewed in a direction of arrows of the line B-B of FIG. 9a. FIG. 9c is a sectional view as viewed toward a conical surface indicated by the line A-A of FIG. 9a in a direction of arrows of the line A-A. This modification example is different from the first embodiment described above in the shape of the relief portions of the deburring-press processed surface, and is the same in other configurations. Portions having the same function are denoted by the same reference symbols (including dashes), and different matters are described below. In FIG. 9c, hatching of the cross section is omitted.

As illustrated in FIG. 9c, relief portions 11b' are each formed in a curved shape curved in the axial direction of the column portion 8 in a projecting manner. Also in this modification example, the relief portion 11b' has the relief amount increased gradually from the axial end of the straight portion 11a toward the pocket corner rounded portion 10b, and is smoothly connected to the straight portion 11a and the pocket corner rounded portion 10b. The relief portion 11b' is formed in a curved shape curved in the axial direction of the column portion 8 in a projecting manner, thereby increasing the degree of freedom in setting a shape of a smooth connecting portion between the straight portion 11a and the relief portion 11b'. Other configurations are the same as those of the first embodiment described above. Thus, all the contents described in the above-mentioned embodiment are applied, and redundant description thereof is omitted.

Figure 10A:
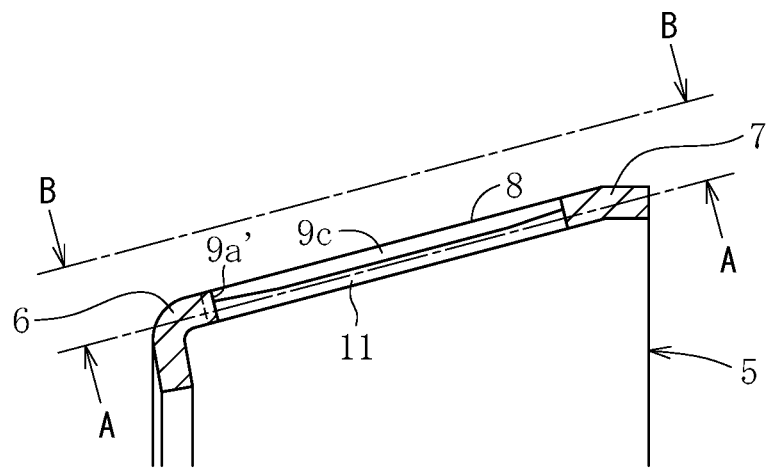
FIG. 10a is an illustration of a cage of a tapered roller bearing according to a second embodiment of the present invention, and is a partial longitudinal sectional view at a center line of the pocket of the cage.
Figure 10B:
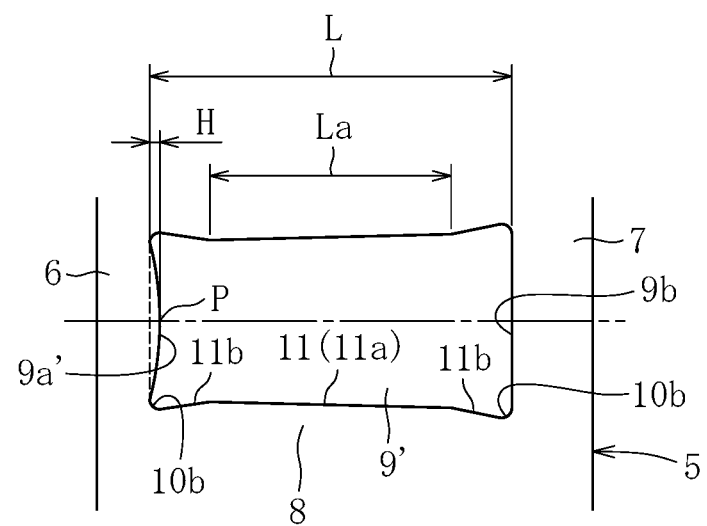
FIG. 10b is a sectional view as viewed toward a conical surface indicated by the line A-A of FIG. 10a in a direction of arrows of the line A-A.

Next, a cage of a tapered roller bearing according to a second embodiment of the present invention is described with reference to FIG. 10a and FIG. 10b. FIG. 10a is a partial longitudinal sectional view at a center line of the pocket of the cage. FIG. 10b is a sectional view as viewed toward a conical surface indicated by the line A-A of FIG. 10a in a direction of arrows of the line A-A. An external view of the column portion as viewed in a direction of arrows of the line B-B of FIG. 10a is the same as that of FIG. 3b, and illustration thereof is omitted.

The cage in this embodiment is different from that of the first embodiment described above in a form of a small-diameter-end side surface of the pocket which is opposed to a small end surface of the tapered roller, and is the same in other configurations. Portions having the same function are denoted by the same reference symbols (including dashes), and different matters are described below. In FIG. 10b, hatching of the cross section is omitted.

As illustrated in FIG. 10a and FIG. 10b, a small-diameter-end side surface 9a' of a pocket 9' which is opposed to the small end surface 4b of the tapered roller 4 (see FIG. 2) is formed in a protruding shape. Specifically, the small-diameter-end side surface 9a' extends from the pocket corner rounded portions 10a (see FIGS. 3b) and 10b in the circumferential direction, and is formed in a protruding shape curved in an arc shape having a vertex P at the center in the circumferential direction. With this, the contact area between the small end surface 4b of the tapered roller 4 and the small-diameter-end side surface 9a' of the pocket 9' is reduced, and oil film formation becomes excellent, thereby contributing to a reduction in torque. Further, the relief portions 11b are formed in the deburring-press processed surface 11 of the column portion 8 of the pocket 9'. However, it is a fact that, in particular, on the small-diameter side, there is a small margin in a distance for avoiding an interference between the pocket corner rounded portion 10b and the chamfered rounded portion 4d (see FIG. 2) of the tapered roller 4. The protruding shape is added to the small-diameter-end side surface 9a thereby more reliably avoiding the interference with the chamfered rounded portion 4d of the tapered roller 4.

The reduction in torque can be further promoted with the above-mentioned configuration in which the small-diameter-end side surface 9a' is formed in a protruding shape as well as the characteristic configuration of the first embodiment described above, that is, the configuration in which the deburring-press processed surface 11 of the column portion 8 comprises the relief portions 11b each formed between the straight portion 11a and the pocket corner rounded portion 10b, and the relief portion 11b has the relief amount increased gradually from the axial end of the straight portion 11a toward the pocket corner rounded portion 10b, and is smoothly connected to the straight portion 11a and the pocket corner rounded portion 10b.

A protruding amount H of the protruding shape of the small-diameter-end side surface 9a' (dimension between the pocket corner rounded portion 10b and the vertex P of the protruding shape in the axial direction) is set in a range of from 0.005 mm to 0.5 mm. When the protruding amount H is less than 0.005 mm, the protruding amount H is too small, and an effect cannot be expected. Meanwhile, when the protruding amount H exceeds 0.50 mm, a pocket gap in a length direction of the tapered roller is reduced, and smooth rotation may be inhibited. The protruding shape of the small-diameter-end side surface 9a' may be formed in a part of the small-diameter-end side surface 9a' in the circumferential direction. Further, the side surface 9c of the column portion 8 which is opposed to the rolling surface 4a of the tapered roller 4 and the deburring-press processed surface 11 may have the configurations in the modification example described above.

Other configurations, actions and effects, and the like of the side surface 9c of the column portion 8 which is opposed to the rolling surface 4a of the tapered roller 4, the deburring-press processed surface 11, and the like are the same as those in the first embodiment. Thus, all the contents described in the above-mentioned embodiment are applied, and redundant description thereof is omitted.

Figure 11A:
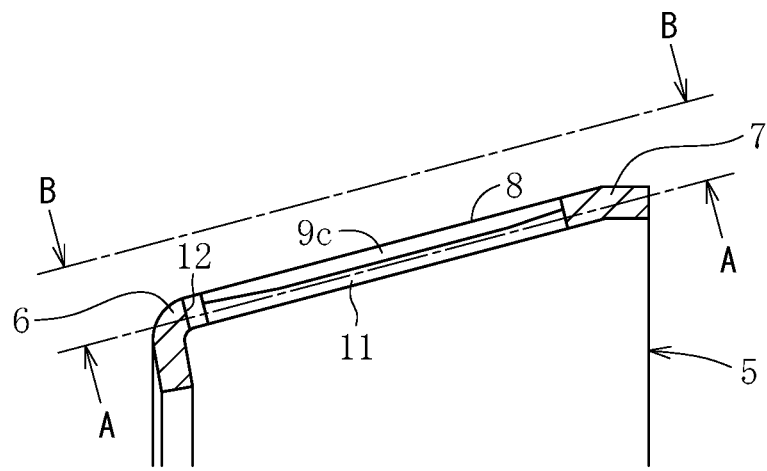
FIG. 11a is an illustration of a cage of a tapered roller bearing according to a third embodiment of the present invention, and is a partial longitudinal sectional view at a center line of the pocket of the cage.
Figure 11B:
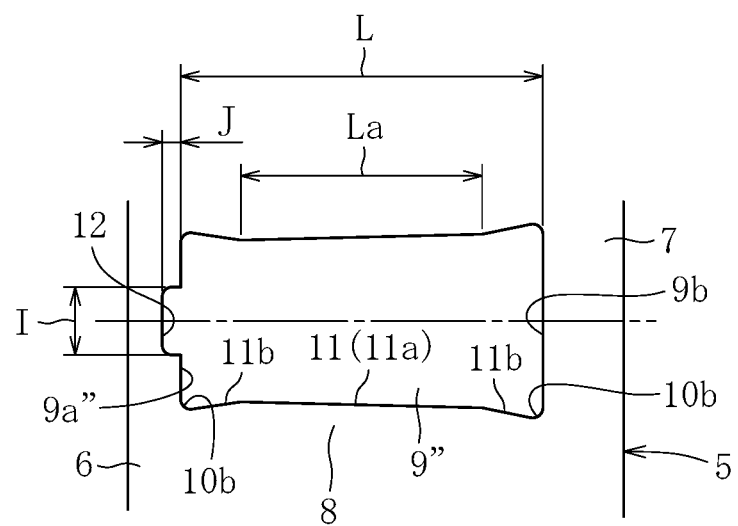
FIG. 11b is a sectional view as viewed toward a conical surface indicated by the line A-A of FIG. 11a in a direction of arrows of the line A-A.

Next, a cage of a tapered roller bearing according to a third embodiment of the present invention is described with reference to FIG. 11a and FIG. 11b. FIG. 11a is a partial longitudinal sectional view at a center line of the pocket of the cage. FIG. 11b is a sectional view as viewed toward a conical surface indicated by the line A-A of FIG. 11a in a direction of arrows of the line A-A. An external view of the column portion as viewed in a direction of arrows of the line B-B of FIG. 11a is the same as that of FIG. 3b, and illustration thereof is omitted. The cage in this embodiment is different from that of the first embodiment described above in a form of a small-diameter-end side surface of the pocket which is opposed to a small end surface of the tapered roller, and is the same in other configurations. Portions having the same function are denoted by the same reference symbols (including reference symbols with dashes), and different matters are described below. In FIG. 11b, hatching of the cross section is omitted.

As illustrated in FIG. 11a and FIG. 11b, a recess portion 12 is formed at a circumferential center of a small-diameter-end side surface 9a" of a pocket 9" which is opposed to the small end surface 4b (see FIG. 2) of the tapered roller 4. The recess portion 12 is formed to penetrate between the inner peripheral surface and the outer peripheral surface of the cage 5 in the radial direction. The recess portion 12 is added to the small-diameter-end side surface 9a" so that lubricating oil interposed between the inner ring 3 and the cage 5 escapes to the outer ring 2 side to reduce stirring resistance of the lubricating oil, thereby contributing to the reduction in torque.

The reduction in torque can be further promoted with the above-mentioned configuration in which the recess portion 12 penetrating between the inner peripheral surface and the outer peripheral surface of the cage 5 in the radial direction is formed in the above-mentioned small-diameter-end side surface 9a" as well as the characteristic configuration of the first embodiment described above, that is, the configuration in which the deburring-press processed surface 11 of the column portion 8 comprises the straight portion 11a, the pocket corner rounded portion 10b and the relief portions 11b each formed between the straight portion 11a and the pocket corner rounded portion 10b, and the relief portion 11b has the relief amount increased gradually from the axial end of the straight portion 11a toward the pocket corner rounded portion 10b, and is smoothly connected to the straight portion 11a and the pocket corner rounded portion 10b.

When a diameter of a small-diameter end of the tapered roller is Dmin (see FIG. 2), a width I of the recess portion 12 formed in the small-diameter-end side surface 9a" in the circumferential direction is set to a range of Dmin×(1.2 to 0.8)/2. When the width I is too large, press punching for the pocket 9" becomes unstable. When the width I is too small, there is no effect on a flow of the lubricating oil. When a width of the small-diameter-side annular portion 6 is "h" (see FIG. 2), a depth J of the recess portion 12 is set in a range of h×(0.05 to 0.3). The basis is the same as the basis of a numerical range of the width I. The rectangular shape is described as an example of the shape of the recess portion 12, but the shape of the recess portion 12 is not limited thereto, and may be an arc shape, a triangular shape, or the like in consideration of a processed surface or a flow of the lubricating oil. The side surface 9c of the column portion 8 which is opposed to the rolling surface 4a of the tapered roller 4 and the deburring-press processed surface 11 may have the configurations in the modification example described above.

Other configurations, actions and effects, and the like of the side surface 9c of the column portion 8 which is opposed to the rolling surface 4a of the tapered roller 4, the deburring-press processed surface 11, and the like are the same as those in the first embodiment. Thus, all the contents described in the above-mentioned embodiment are applied, and redundant description thereof is omitted.

A gap 6 between a radially inner surface of the small-diameter-side annular portion 6 of the cage 5 illustrated in FIG. 1 and a radially outer surface of the small flange portion 3b of the inner ring 3 may be set to be 2.0% or less of an outer diameter dimension of the small flange portion 3b. With this, an amount of the lubricating oil flowing in from the gap 6 is reduced. Thus, an amount of the lubricating oil accumulated inside the bearing is reduced so that stirring resistance of the oil is reduced, thereby contributing to a reduction in rotational torque of the bearing.

In the embodiments and the modification example described above, the side surface 9c of the column portion 8 which faces the pocket 9 comprises the deburring-press processed surface 11 on the radially inner side of the side surface 9c. The deburring-press processed surface 11 comprises the straight portion 11a located at the center of the column portion 8 in the axial direction, the pocket corner rounded portions 10b, and the relief portions 11b each formed between the straight portion 11a and the pocket corner rounded portion 10b. Each of the relief portions 11b, 11b' has the relief amount increased gradually from the axial end of the straight portion 11a toward the pocket corner rounded portion 10b, and is smoothly connected to the straight portion 11a as the effect of the press working and at the level in shot processing. In addition, as advantageous configurations, the small-diameter-end side surface 9a' of the pocket 9' which is opposed to the small end surface 4b of the tapered roller 4 is formed in a protruding shape. Further, the small-diameter-end side surface 9a" of the pocket 9" which is opposed to the small end surface 4b of the tapered roller 4 has the recess portion 12 formed to penetrate between the inner peripheral surface and the outer peripheral surface of the cage 5 in the radial direction. Moreover, the gap 6 between the radially inner surface of the small-diameter-side annular portion 6 and the radially outer surface of the small flange portion 3b of the inner ring 3 may be set smaller to 2.0% or less of the outer diameter dimension of the small flange portion 3b. With this, it is possible achieve the tapered roller bearing capable of attaining the reduction in torque while suppressing the reduction in cage strength. In particular, the present invention is suitable for attaining both a reduction in size and a reduction in torque in a tapered roller bearing for an automobile, which has a relatively small diameter.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 tapered roller bearing
2 outer ring
2a raceway surface
3 inner ring
4 tapered roller
5 cage
6 small-diameter-side annular portion
7 large-diameter-side annular portion
8 column portion
9 pocket
9a small-diameter-end side surface
10a pocket corner rounded portion
10b pocket corner rounded portion
11 deburring-press processed surface
11a straight portion
11b relief portion
12 recess portion
A relief amount

The invention claimed is:

1. A tapered roller bearing, comprising:
an inner ring having a raceway surface having a conical shape on an outer periphery of the inner ring;
an outer ring having a raceway surface having a conical shape on an inner periphery of the outer ring;
a plurality of tapered rollers incorporated between both the raceway surfaces; and
a cage configured to receive the tapered rollers,
wherein the cage is formed of a metal material, and comprises:
a small-diameter-side annular portion at a small-diameter end surface side of the tapered rollers, the small-diameter-side annular portion being continuous in a circumferential direction of the cage;
a large-diameter-side annular portion at a large-diameter end surface side of the tapered rollers, the large-diameter-side annular portion being continuous in the circumferential direction of the cage; and
a plurality of column portions coupling the small-diameter-side annular portion and the large-diameter-side annular portion to each other,
wherein the small-diameter-side annular portion, the large-diameter-side annular portion, and the column portions define pockets configured to receive the tapered rollers,
wherein a radially inner side of a side surface of each of the column portions facing the pockets comprises a deburring-press processed surface,
wherein each of the deburring-press processed surfaces comprises:
a straight portion located at a center of an adjacent one the pockets in an axial direction of the column portion;
pocket corner rounded portions located at both ends of the adjacent one of the pockets in the axial direction of the column portion; and
relief portions each formed between the straight portion and one of the pocket corner rounded portions, and
wherein each of the relief portions has a relief amount between the deburring-press processed surface and one of the tapered rollers received in the adjacent one of pockets that increases from an axial end of the straight portion toward one of the pocket corner rounded portions such that the deburring-press processed surface is farther away from the one of the tapered rollers received in the adjacent one of pockets at the pocket corner rounded portion than at the axial end of the straight portion, the relief portion being connected to the straight portion.

2. The tapered roller bearing according to claim 1, wherein, for each of the column portions, the relief portions are each formed in a straight shape inclined with respect to the axial direction of the column portion.

3. The tapered roller bearing according to claim 1, wherein, for each of the column portions, the relief portions are each formed in a concave shape in the axial direction of the column portion.

4. The tapered roller bearing according to claim 1, wherein a small-diameter-end side surface of each of the pockets, which is opposed to a small end surface of one of the tapered rollers, is formed in a protruding shape.

5. The tapered roller bearing according to claim 1, wherein a small-diameter-end side surface of each of the pockets, which is opposed to a small end surface of one of the tapered rollers, has a recess portion formed to penetrate between an inner peripheral surface and an outer peripheral surface of the cage in a radial direction of the cage.

\* \* \* \* \*